United States Patent [19]

Vogel

[11] 4,196,872
[45] Apr. 8, 1980

[54] TAPE TRANSPORT APPARATUS WITH TRANSLATIVE FRICTION FORCE SYSTEM

[75] Inventor: Charles A. Vogel, San Jose, Calif.

[73] Assignee: American Videonetics Corporation, Santa Clara, Calif.

[21] Appl. No.: 923,993

[22] Filed: Jul. 12, 1978

[51] Int. Cl.² .............................................. G11B 15/32
[52] U.S. Cl. ................................................... 242/192
[58] Field of Search ......................... 242/192, 210, 204

[56] References Cited
U.S. PATENT DOCUMENTS

| 3,370,804 | 2/1968 | Peyton | 242/192 |
| 3,482,800 | 12/1969 | Barnett et al. | 242/192 |
| 3,960,342 | 6/1976 | Furst | 242/192 |
| 4,018,402 | 4/1977 | Burdorf | 242/142 |
| 4,093,150 | 6/1978 | Burdoff et al. | 242/192 |

Primary Examiner—George F. Mautz
Attorney, Agent, or Firm—Flehr, Hohbach, Test, Albritton & Herbert

[57] ABSTRACT

Tape transport apparatus of the type in which a drive capstan engages supply and take-up rolls in peripheral driving relationship. Movement of the take-up roll away from the capstan is resisted by a frictional force produced by a brake band wrapped about a brake drum which is affixed to the carriage which supports the take-up roll.

11 Claims, 2 Drawing Figures

TAPE TRANSPORT APPARATUS WITH TRANSLATIVE FRICTION FORCE SYSTEM

BACKGROUND OF THE INVENTION

This invention pertains generally to apparatus for transporting magnetic tape during the recording and playback of signals thereon, and more particularly to transport apparatus of the type in which a drive capstan engages supply and take-up rolls in peripheral driving relationship.

In tape transport apparatus of this type, it is important from the standpoint of tape control to maintain a proper force differential whereby the take-up roll is pressed against the drive capstan with a greater force than the supply roll. One method of providing the desired force differential is to resist movement of the take-up roll away from the capstan as tape is transferred to that roll while permitting the supply roll to move freely toward the capstan. In order to prevent loss of control of the tape it is essential that this force differential be established immediately when tape movement begins, and that it be reversed immediately when the direction of tape movement is reversed, so as to apply he greater force to the new take-up roll as quickly as possible.

SUMMARY AND OBJECTS OF THE INVENTION

The invention provides tape transport apparatus having independently movable carriages for supporting the supply and take-up rolls for movement toward and away from the drive capstan, means connected to the carriages for yieldably urging the supply and take-up rolls toward the capstan, a brake drum affixed to each of the carriages for movement therewith, a brake band wrapped about each brake drum, and means for selectively tightening the brake bands into frictional engagement about the brake drums to yieldable resist movement of the tape rolls away from the capstan.

It is in general an object of the invention to provide new and improved tape transport apparatus utilizing static frictional forces to provide a force differential between the supply and take-up rolls.

Another object of the invention is to provide tape transport apparatus which includes means for applying and removing the static frictional forces instantaneously so that the force differential can be applied quickly when tape movement begins, and can be reversed quickly when the direction of tape movement is reversed, so as to maintain positive control of the tape.

Additional objects and features of the invention will be apparent from the following description in which the preferred embodiments are set forth in detail in conjunction with the accompanying drawing.

DESCRIPTION OF THE PREFERRED EMBODIMENTS

Figure 1:
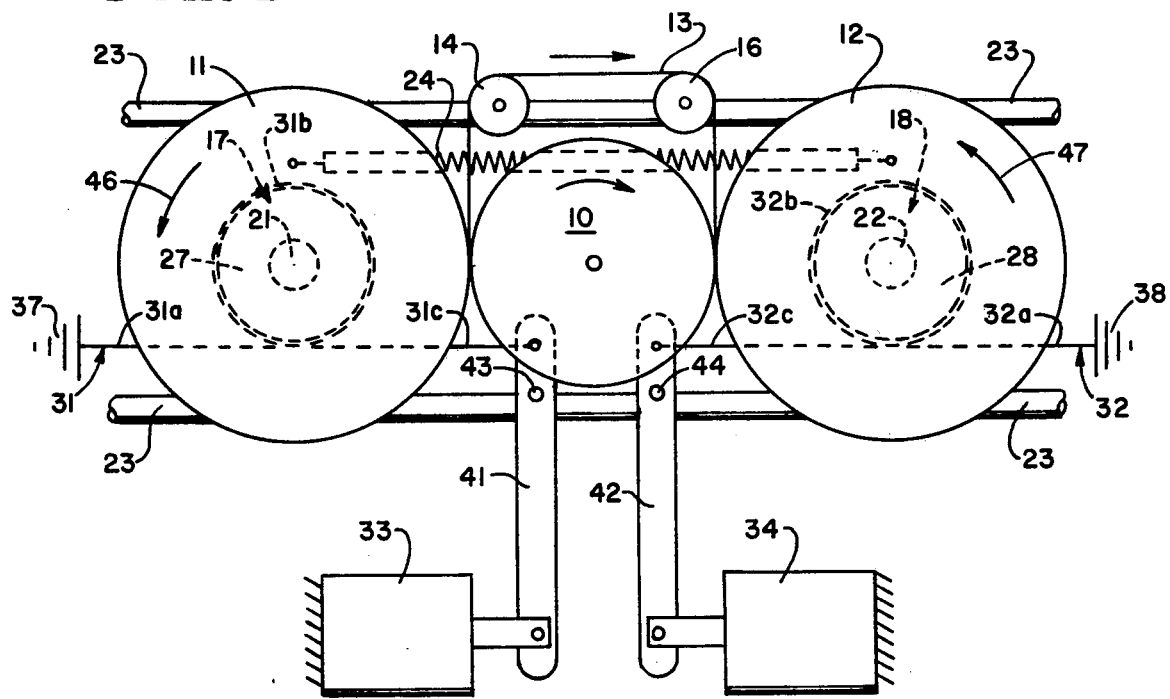
FIG. 1 is a top plan view, somewhat schematic, of one embodiment of transport apparatus according to the invention.

As illustrated in FIG. 1, the transport apparatus includes a rotatively driven capstan 10 in peripheral driving engagement with a supply roll 11 and a take-up roll 12. Between the supply and take-up rolls, the tape 13 is trained about guides 14, 16 to form a loop of tape for engagement with a suitable transducer, not shown.

The supply and take-up rolls are rotatively mounted on carriages 17, 18 by means of spindles 21, 22 for movement toward and away from capstan 10. The carriages are mounted on the base of the apparatus for translational or lineal movement toward and away from the capstan by suitable means such as horizontally extending guide rods or ways 23. A spring 24 interconnects the carriages for yieldably urging the carriages and tape rolls carried thereby toward the drive capstan.

Means is provided for selectively applying static frictional forces to the take-up carriage for yieldable resisting movement of the same away from the drive capstan. This means includes brake drums 27, 28 which are affixed to the carriages and do not rotate relative to the carriages, together with brake bands 31, 32 which are wrapped about the brake drums. Electrically energizable solenoids 33, 34 are mounted on the base and provide means for selectively tightening the brake bands into frictional engagement about the brake drums. One end 31a, 32a of each of the brake bands is affixed to the base at 37 and 38 respectively, and the central portions 31b, 32b are wrapped for one or more revolutions about the respective brake drums. The free ends 31c, 32c of the bands extend tangentially from the drums in a direction generally opposite to that of ends 31a, 32a, respectively and are connected to the solenoids by means of linkage arms 41, 42. These arms are pivotally mounted on the base by means of pins 43, 44, and the points of connection to the brake bands and solenoids are spaced from the pivot pins to provide a mechanical advantage.

Operation and use of the embodiment of FIG. 1 are as follows. With capstan 10 rotating in the clockwise direction, the tape rolls rotate in the direction indicated by arrows 46, 47, and the tape is transferred from roll 11 to roll 12. When the tape moves in this direction, solenoid 33 is de-energized and solenoid 34 is energized so that brake band 31 is slackened about brake drum 27 and brake band 32 is tightened in frictional engagement about brake drum 28. As tape is transferred to take-up roll 12 and the roll diameter is therefore increasing, carriage 18 is forced to move away from capstan 10, causing brake band 32 to slide about non-rotating brake drum 28. The force pressing takeup roll 12 against the capstan 10 is therefore equal to the force exerted by spring 24 plus the resistive frictional force exerted by the combination of brake 32 and brake drum 28. Because brake band 31 is disengaged from drum 27, the only force acting to press supply roll 11 against capstan 10 is the force exerted by spring 24. The required force differential is therefore established.

When the tape moves in the other direction, roll 11 becomes the new take-up roll, solenoid 34 is de-energized, and solenoid 33 is energized to resist the movement of this roll away from the capstan. The energization of a solenoid is initiated at the outset of tape movement toward a given roll, and the solenoid remains energized throughout the movement of tape in that direction.

The links 41, 42 are so located that the force they exert on their respective brake bands (at 31c or 32c) will act to pull their respective tape rolls (11, 12) against capstan 10 with full take-up force immediately their respective solenoids (33,34) are energized.

Figure 2:
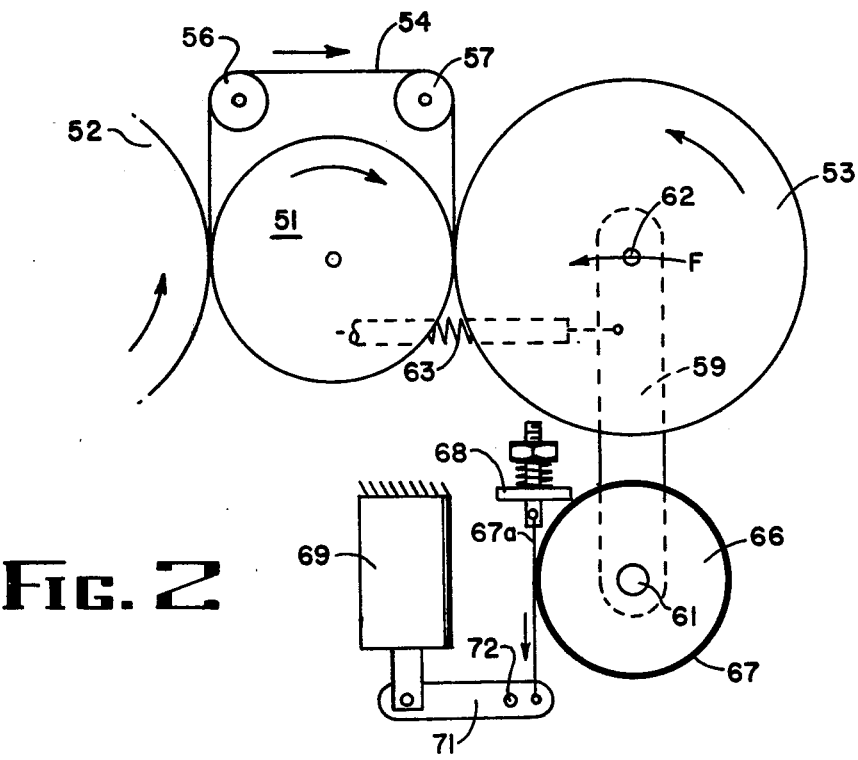
FIG. 2 is a fragmentary top plan view, somewhat schematic, of a second embodiment of transport apparatus according to the invention.

The transport apparatus illustrated in FIG. 2 includes a drive capstan 51 which engages a supply roll 52 and a take-up roll 53 in driving relationship. Between the supply and take-up rolls, tape 54 is trained around guides 56, 57. Each of the tape rolls is mounted on a swing arm 59 for movement toward and away from the drive capstan. For ease of illustration, only the swing arm and associated components for the take-up roll are shown in FIG. 2. It will be understood, however, that a similar arm and components are provided on the supply side and that either roll can function as the take-up roll, depending upon the direction of tape movement.

Swing arm 59 is pivotably mounted on the base of the transport apparatus by means of a pivot pin 61, and the tape roll is rotatively mounted on the swing arm by means of a spindle 62. A spring 63 interconnects the swing arms and yieldably urges the tape rolls toward the drive capstan.

Means is provided for selectively applying static frictional force to the take-up carriage for yieldably resisting movement of the take-up roll away from the capstan. This means includes a brake drum 66 which is affixed to swing arm 59 for coaxial movement therewith about pivot pin 61. A brake band 67 is wrapped about the brake drum and connected at one end to an anchor 68 affixed to the base. As illustrated, the anchor includes an adjusting screw and nut for adjusting the tension in the band. The free end of the brake band is connected to the plunger of a solenoid 69 by means of a linkage arm 71. Arm 71 is pivotably mounted on the base by means of a pivot pin 72, and the points of connection of the band and solenoid are spaced from the pin to provide a mechanical advantage.

Operation and use of the emboidment of FIG. 2 are as follows. With the drive capstan 51 rotating in the clockwise direction, tape is fed from roll 52 to 53, and take-up solenoid 69 is energized so that brake band 67 is tightened in frictional engagement about brake drum 66. On the supply side (not shown) the corresponding supply solenoid is de-energized and the brake band is slack about its respective brake drum. As the tape is wound on roll 53 and the roll diameter is therefore increasing, swing arm 59 is forced to pivot away from capstan 51, causing brake drum 66 to rotate within brake band 67. The force pressing take-up roll 53 against capstan 51 is therefore equal to the force exerted by spring 63 plus the resistive frictional force exerted by the combination of brake drum 66 and brake band 67. Because the brake band on the supply side is disengaged from its related brake drum, the only force acting to press supply roll 52 against capstan 51 is the force exerted by spring 63. The required force differential is therefore established.

When the tape moves in the other direction, roll 52 becomes the new take-up roll, solenoid 69 is de-energized, and the corresponding solenoid on the new take-up side is energized to resist the movement of this roll away from the capstan. As in the embodiment of FIG. 1, the initial energization of the solenoid produces a slight movement of the new take-up roll toward the capstan which immediately causes this roll to be pressed against the capstan with full take-up force, thereby assuring proper control of the tape during start-up or reversal of tape movement. It should be noted that it is the natural elasticity of materials, such as of the brake bands used in the embodiments of both FIGS. 1 and 2, which normally allows for this small initial movement of the tape rolls toward the capstan when a solenoid is energized and a brake is applied; however, where this is insufficient, appropriate springs (not shown) may be incorporated between the ends of the brake bands 32a, 67a, etc. and the respective anchor points on the base 38, 68, etc.

The invention has a number of important features and advantages. It is simple and inexpensive to manufacture. The brake bands and drums provide an effective means of producing the desired force differential between the take-up and supply sides of the capstan. The forces can be applied and reversed instantaneously to maintain proper control of the tape during reversals of tape movement.

It is apparent from the foregoing that a new and improved tape transport apparatus has been provided. While only the presently preferred embodiments have been described, as will be apparent to those familiar with the art, certain changes and modifications can be made without departing from the scope of the invention as defined by the following claims.

What is claimed is:

1. In tape transport apparatus of the type having a drive capstan for engaging supply and take-up rolls in peripheral driving relationship: independently movable carriage means for rotatively supporting the supply and takeup rolls for movement toward and away from the drive capstan, means connected to the carriage means for yieldably urging the supply and take-up rolls toward the capstan, a brake drum affixed to each of said carriage means in such manner that the brake drum cannot rotate relative to the carriage means, a brake band wrapped about each brake drum, and means for selectively tightening the brake bands into frictional engagement about the brake drums to yieldably resist movement of the take-up roll away from the capstan.

2. The apparatus of claim 1 wherein the carriage means comprises lineally movable carriages for carrying the supply and take-up rolls for lineal movement toward and away from the capstan.

3. The apparatus of claim 1 wherein the carriage means comprises pivotally mounted swing arms for carrying the supply and take-up rolls for arcuate movement toward and away from the capstan.

4. The apparatus of claim 1 wherein each of the bands has an intermediate portion wrapped about one of the brake drums and end portions extending tangentially from the drum in opposite directions, and the means for tightening the bands are connected to the tangentially extending portions and adapted for pulling the same in opposite directions.

5. The apparatus of claim 4 wherein the tangentially extending end portions lie in a plane parallel to the direction of movement of the carriage.

6. The apparatus of claim 1 wherein the means for tightening the brake bands comprises an electrically energizable solenoid connected to each of the bands.

7. In tape transport apparatus of the type having a drive capstan for engaging supply and take-up rolls in peripheral driving relationship: a base, supply and take-up roll carriages mounted on the base for linear movement toward and away from the drive capstan, means for rotatively mounting the supply and take-up rolls on respective ones of the carriages, means connected to the carriages for yieldably urging the carriages toward the capstan, a non-rotating brake drum affixed to each of the carriages, a brake band wrapped about each brake drum and connected at one end to the base, and means connected to the free ends of the brake bands for selectively tightening said bands into frictional engagement about the brake drums to yieldably resist linear movement of the carriages away from the capstan.

8. In tape transport apparatus of the type having a drive capstan for engaging supply and take-up rolls in peripheral driving relationship: a base, a pair of swing arms pivotally mounted on the base for supporting the supply and take-up rolls for movement toward and away from the capstan, means connected to the swing arms for yieldably urging the tape rolls toward the capstan, a brake drum non-rotatably affixed to each of the swing arms for pivotal movement therewith, a brake band wrapped about each brake drum and connected at one end to the base, and means connected to the free ends of the brake bands for selectively tightening the bands into frictional engagement about the brake drums to yieldably resist movement of the swing arms away from the capstan.

9. The apparatus of claim 8 wherein the brake drums are positioned coaxially of the axes about which the swing arms pivot.

10. The apparatus of claim 7 or 8 wherein the means for tightening the brake bands comprises electrically energizable solenoids mounted on the base and connected to the free ends of the bands.

11. The apparatus of claim 10 wherein the solenoids are connected to the brake bands by linkage arms pivotally mounted on the base.

* * * * *